(12) United States Patent
Schiffers et al.

(10) Patent No.: US 10,245,771 B2
(45) Date of Patent: Apr. 2, 2019

(54) METHOD FOR THE PROCESS MANAGEMENT OF A MOLD-FILLING PROCESS OF AN INJECTION MOLDING MACHINE

(71) Applicant: KRAUSSMAFFEI TECHNOLOGIES GMBH, München (DE)

(72) Inventors: Reinhard Schiffers, München (DE); Stefan Moser, Hallbergmoos (DE); Stefan Kruppa, München (DE)

(73) Assignee: KRAUSSMAFFEI TECHNOLOGIES GMBH, München (DE)

( * ) Notice: Subject to any disclaimer, the term of this patent is extended or adjusted under 35 U.S.C. 154(b) by 447 days.

(21) Appl. No.: 15/027,625

(22) PCT Filed: Oct. 2, 2014

(86) PCT No.: PCT/EP2014/071159
§ 371 (c)(1),
(2) Date: Apr. 6, 2016

(87) PCT Pub. No.: WO2015/052072
PCT Pub. Date: Apr. 16, 2015

(65) Prior Publication Data
US 2016/0250791 A1     Sep. 1, 2016

(30) Foreign Application Priority Data
Oct. 11, 2013 (DE) .......................... 10 2013 111 257

(51) Int. Cl.
B29C 45/76     (2006.01)
B29C 45/77     (2006.01)

(52) U.S. Cl.
CPC .......... *B29C 45/7613* (2013.01); *B29C 45/76* (2013.01); *B29C 45/7646* (2013.01); *B29C 45/77* (2013.01); *B29C 2945/76006* (2013.01); *B29C 2945/76056* (2013.01); *B29C 2945/76063* (2013.01); *B29C 2945/76381* (2013.01);
(Continued)

(58) Field of Classification Search
CPC .............. B29C 45/77; B29C 2045/776; B29C 45/7613
See application file for complete search history.

(56) References Cited

U.S. PATENT DOCUMENTS

| 5,062,785 | A | | 11/1991 | Stroud, III |
| 6,006,601 | A | * | 12/1999 | Osborne ................. B29C 45/00 425/125 |

(Continued)

FOREIGN PATENT DOCUMENTS

| DE | 35 24 310 C1 | 6/1986 |
| DE | 10 2005 032 367 A1 | 1/2007 |

(Continued)

*Primary Examiner* — Alison L Hindenlang
*Assistant Examiner* — Mini A Brebion
(74) *Attorney, Agent, or Firm* — Henry M. Feiereisen LLC

(57) ABSTRACT

The invention relates to a method for filling a mold cavity of a molding tool in a volumetrically correct manner. A molded part/volume equivalence is ascertained during a learning phase, and production injection-molding cycles are influenced during a production phase such that the molded part/volume equivalence ascertained during the learning phase is also satisfied during the production injection-molding cycle.

19 Claims, 4 Drawing Sheets

(52) U.S. Cl.
CPC ............... *B29C 2945/76404* (2013.01); *B29C 2945/76936* (2013.01); *B29C 2945/76949* (2013.01); *B29C 2945/76966* (2013.01)

(56) References Cited

U.S. PATENT DOCUMENTS

| | | | |
|---|---|---|---|
| 2002/0055806 A1* | 5/2002 | Brown | ................ B29C 45/7686 700/197 |
| 2007/0168079 A1 | 7/2007 | Ludwig | |
| 2009/0278274 A1 | 11/2009 | Bader | |

FOREIGN PATENT DOCUMENTS

| | | |
|---|---|---|
| DE | 10 2007 061 775 A1 | 7/2009 |
| EP | 2 583 811 A1 | 4/2013 |

\* cited by examiner

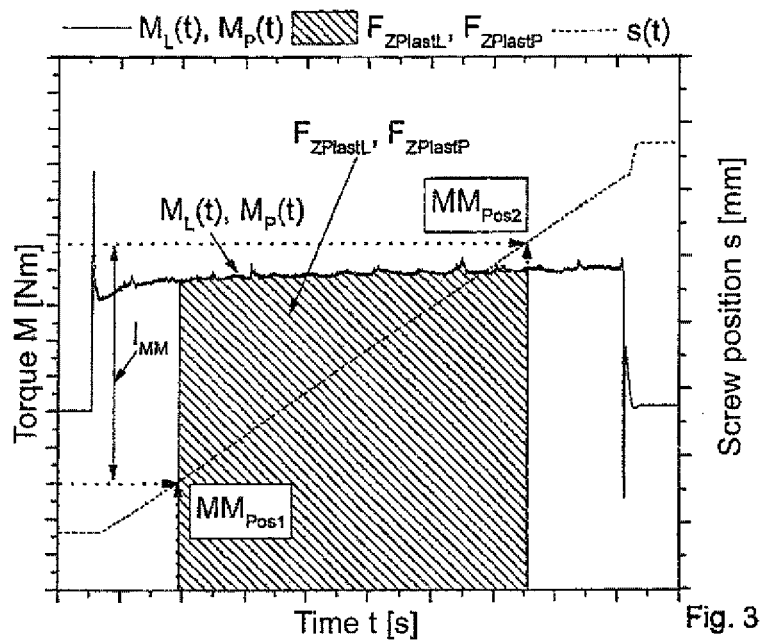
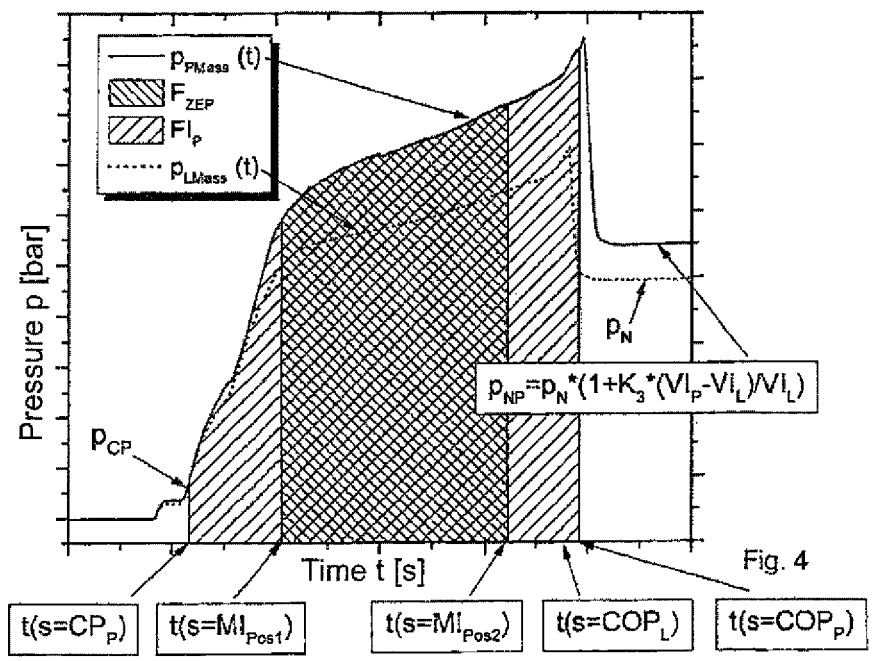

METHOD FOR THE PROCESS MANAGEMENT OF A MOLD-FILLING PROCESS OF AN INJECTION MOLDING MACHINE

CROSS-REFERENCES TO RELATED APPLICATIONS

This application is the U.S. National Stage of International Application No. PCT/EP2014/071159, filed Oct. 2, 2014, which designated the United States and has been published as International Publication No. WO 2015/052072 and which claims the priority of German Patent Application, Serial No. 10 2013 111 257.9, filed Oct. 11, 2013, pursuant to 35 U.S.C. 119(a)-(d).

BACKGROUND OF THE INVENTION

The invention relates to a method for the process management of a mold-filling process of an injection molding machine.

Approaches are known from the prior art for compensating individual process fluctuations, which have a negative influence on the mold-filling process of an injection molding machine and are caused by interfering influences.

A method for quantifying process fluctuations in an injection process of an injection molding machine is known from EP 2 583 811 A1. This method uses reference curves of characteristic variables along a path or a multiplicity of positions (x), which covers an injector of an injection molding machine during an injection process. The characteristic variables can be pressure values, e.g. an injection pressure, a melt pressure, an internal mold pressure or an internal mold temperature. At least one of the characteristic variables is measured for a multiplicity of positions of the injector during an injection process, so that a measurement function results. Furthermore, the method disclosed in this published document uses at least one mathematical transformation, by means of which the measurement function created in the measurement is mapped onto the reference function of the characteristic variable in the best possible manner. To this end, the method uses a freely selectable transformation parameter, which is determined in such a manner that an image function resulting from the measurement function matches the reference function in the best possible manner with respect to a predetermined error measure. A process fluctuation is assigned to the transformation parameter. The process fluctuation is qualified with reference to the reference function under the use of at least one transformation parameter. Fluctuations of the shot volume and fluctuations of the pressure requirement for filling a cavity are specified inter alia as possible process fluctuations.

It is known from DE 35 24 310 C1, for the regulated operation of plastic injection molding machines, to call upon the injection operation for managing the injection molding process. The aim is to move a movement of the screw, for example a first screw A and a second screw B with different screw characteristics, in a regulated manner for a constantly equal injection duration. A final value for the screw path and the holding pressure profile are stored and called upon for an adjustment factor. Process management via the injection operation has the disadvantage however that it is strongly characterized by irregularities in the start-up phase of the injection process and cannot compensate an uneven closing behavior of a non-return valve.

A method is known from DE 10 2007 061 775 A1, in which the temporal course of the mold internal pressure is measured during the holding-pressure phase of an injection-molding process. At least one non-time-dependent characteristic variable is determined from this temporal curve of the mold internal pressure, for which this or each characteristic variable is compared with a stored characteristic-variable set-point value and for which, on the basis of the comparison result, an adjusted holding pressure value for a subsequent injection-molding process is automatically determined. In this method, learning is therefore carried out in a preceding injection-molding process for a subsequent injection-molding process, wherein a correction of a changing characteristic-variable value takes place in the context of a holding-pressure adjustment.

From DE 10 2005 032 367 A1, an approach is followed such that the time, which the melt requires during the injection process up to a sensor in the cavity, is monitored and the viscosity of the melt is adjusted in the event of changes or differences in this time which are deemed to be too large. To adjust the viscosity, it is suggested to change the temperature of the melt. This method makes use of the discovery that the flow rate of the melt can be changed by a change in the viscosity of the melt.

Approaches of this type from the published documents mentioned for compensating interfering influences often relate to a reference curve of one or a plurality of process variables. This disadvantageously has the consequence that it is necessary to permanently make an adjustment with respect to a reference. This often entails further manual corrections if the production conditions, e.g. the environmental conditions or the material qualities of the plastic to be processed, change beyond a certain extent. In addition, at least certain of the approaches mentioned appear complicated and cost intensive with regards to their technical feasibility.

SUMMARY OF THE INVENTION

It is therefore the object of the invention to specify a method for the process management of a mold-filling process of a cavity of a mold of an injection molding machine, in which the cavity is individually filled in a volumetrically correct manner. Furthermore, a method of this type should be specified, which makes it possible, while the injection process is still running, to influence this ongoing injection process in such a manner that a volumetrically correct filling of the cavity takes place.

The method according to the invention should additionally be able to compensate material properties, which change over a production period due to environmental influences, such as e.g. shop temperatures or air humidities or batch fluctuations of the material to be used. Starting and restarting injection-molding processes should likewise be facilitated.

The method according to the invention for the volumetrically correct filling of a cavity of a mold with a melt of a material to be processed in an injection-molding process has a learning phase and a production phase, wherein at least the following steps 1 to 5 are carried out in the learning phase and at least the following steps 6 to 8 are carried out in the production phase. The steps of the learning phase are:

1. Provision of an injection molding machine equipped with a mold, wherein the injection molding machine is set up for producing a good part in a cavity of the mold,
2. Carrying out at least one learning injection-molding cycle to obtain a good part and recording a pressure curve $p_{LMass}(t)$ correlating to the mass pressure curve 3. Determining a viscosity index ($VI_L$), which characterizes the melt of the learning injection-molding cycle, during the injection phase (EL) of the learning injection-molding cycle or during a plasticization phase (PL) preceding the learning injection-molding cycle,
4. Determining a filling index ($FI_L$) as an index for the volumetrically correct filling of the cavity of the good part in the learning injection-molding cycle, wherein the following is true $$FI_L = \int_{t(s=CP_L)}^{t(s=COP_L)} p_{LMass}(t)\,dt,$$

where $t(s=COP_L)$ is the time at the screw position ($s=COP_L$) of the changeover point ($COP_L$) in the learning injection-molding cycle and $t(s=CP_L)$ is the time at which the screw position ($s=CP_L$) has reached a position at which a predefined pressure $p_{LMass}(t)=p_{CP}$ is applied, or has reached a position at which the filling of the cavity begins, wherein the following is true:

$s=CP_L > s=COP_L$

5. Formation of a molded-part volume equivalent $MPV_{eq} = FI_L/VI_L$.

The steps of the production phase are:
6. Carrying out a multiplicity of production injection-molding cycles using the mold, recording at least one pressure curve $p_{PMass}(t)$ correlating to the mass pressure curve, wherein a viscosity index ($VI_P$), which characterizes the melt of the current production injection-molding cycle, is determined during the injection phase (EP) of the production injection-molding cycle or during a plasticization phase (PL) preceding the production injection-molding cycle,
7. after the determination of the viscosity index ($VI_P$), the required filling index ($FI_P$) for the current production injection-molding cycle is calculated from $FI_P = MPV_{eq} * VI_P$ and
8. a changeover point ($COP_P$) of the production injection-molding cycle and/or an injection rate profile is adjusted in such a manner during the remaining injection phase (EP) that the following is true, $$FI_P = \int_{t(s=CP_P)}^{t(s=COP_P)} p_{PMass}(t)\,dt = MPV_{eq} \cdot VI_P$$

According to the invention, it was therefore discovered that a volumetrically correct filling of a cavity can be achieved if a molded-part volume equivalent $MPV_{eq}$ determined in a learning phase is also achieved in cycles of the production phase. The molded-part volume equivalent $MPV_{eq}$ is in this case formed in a learning phase as a quotient of a filling index $FI_L$ and a viscosity index $VI_L$, which are both determined in a learning cycle. The viscosity index $VI_L$ of the learning injection cycle in this case characterizes the melt, i.e. the melt properties of the material used in the learning injection-molding cycle for the environmental and other operating conditions of the injection molding machine present in the learning injection-molding cycle when producing the good part. In this case, the determination of the viscosity index $VI_L$ can take place during the injection phase EL of the learning injection-molding cycle or during a plasticization phase PL preceding the learning injection-molding cycle. The filling index $FI_L$ in this case constitutes an index for a volumetrically correct mold filling of a good part in the learning injection-molding cycle and is calculated as a pressure integral of the pressure curve $P_{LMass}(t)$ between the time limits $t(s=CP_L)$ and $t(s=COP_L)$.

In the production phase, the viscosity index $VI_P$, e.g. during the production injection-molding cycle, is then determined on the basis of the discovery that the molded-part volume equivalent $MPV_{eq}$ of the learning injection-molding cycle is also to be kept constant in the production injection-molding cycle. This viscosity index $VI_P$ in this case characterizes the melt of the current production injection-molding cycle. This can take place analogously to the learning phase in turn during the injection phase (EP) of the production injection-molding cycle or during a plasticization phase (PP) preceding the production injection-molding cycle. Thus, the value of the viscosity index VIP in the production injection-molding cycle can be calculated and is therefore known either at a time $t(s=MM_{Pos2})$ or at the latest at a time $t(s=MI_{Pos2})$. Knowing the viscosity index $VI_P$ present for the production injection-molding cycle to be influenced, it is possible to determine the required filling index $FI_P$ from the equation $FI_P = MPV_{eq} * VI_P$.

Analogously to the learning process, the required filling index $FI_P$ can be specified in the production process according to the equation $$FI_P = \int_{t(s=CP_P)}^{t(s=COP_P)} p_{PMass}(t)\,dt$$

This integral is recorded since the time $t(s=CP_P)$ for the production injection-molding cycle which is ongoing and to be influenced. As soon as the value of this integral has reached the value of the required filling index $FI_P$, a changeover from the injection phase EP to the holding-pressure phase NP occurs by means of the machine control. This time then constitutes the upper integration limit $t(s=COP_P)$, that is to say the time at which changeover takes place. The associated screw position $s=COP_P$ corresponds to the screw position s of the changeover point $COP_P$ of the current production injection-molding cycle.

As a result, the respective production injection-molding cycle is therefore individually managed on the basis of the required filling index $FI_P$ determined for this production injection-molding cycle. Individual changeover points $COP_P$ for each production injection-molding cycle result from this individual management of the production injection-molding cycle on the basis of the value for $FI_P$ to be reached.

As described above, the determination of the viscosity index $VI_P$ for the current production injection-molding cycle can be undertaken either during the injection phase EP or during a plasticization phase PP preceding the production injection-molding cycle.

If the viscosity index $VI_P$ is determined during a preceding plasticization phase PP, the value for the required filling index $FI_P$ of the current production injection-molding cycle is fixed already before the start of the injection phase EP. The integration relating to the filling index $FI_P$ begins at time $t(s=CP_P)$, which is a time during the injection phase EP. For practical use, it follows that starting from the integration starting point $t(s=CP_P)$, the entire remainder of the injection phase EP of the production injection-molding cycle is available for influencing.

If the viscosity index $VI_P$ of the current production injection-molding cycle is determined during the injection phase EP of the current production injection-molding cycle, which takes place by means of an integration in a measurement interval MI of the pressure curve $p_{PMass}(t)$—as described in the following—and takes place overlapping temporally with the integrative determination of the filling index $FI_P$, then in this case, the viscosity index $VI_P$ to be used as a basis for the current production injection-molding cycle is fixed only after the completion of the integration of relating to the viscosity index $VI_P$. The required filling index $FI_P$ can be determined at this time at the earliest. Thus, in this case, after determining the viscosity index $VI_P$, the remainder of the remaining injection phase EP is still available for influencing the production injection-molding cycle with the aim of achieving the required filling index $FI_P$. This has proven satisfactory in practice.

One advantage for the latter option is the fact that the viscosity index $VI_P$ has a higher accuracy if it is determined in the injection phase EP and the melt of the current production injection-molding cycle is better characterized as a viscosity index $VI_P$, which is determined during a preceding plasticization phase PP.

In summary, there are two options to fulfill the equation $$FI_P = MPV_{eq} * VI_P.$$

1. The process management of the production injection-molding cycle is carried on for a predetermined screw speed profile until the value of the integral $$FI_P = \int_{t(s=CP_P)}^{t(s=COP_P)} p_{PMass}(t)\,dt$$

corresponds to the required filling index $FI_P$ determined from the viscosity index $VI_P$ and the molded-part volume equivalent $MPV_{eq}$. When the value for the required filling index $FI_P$ is reached, the changeover from the injection phase EP to the holding-pressure phase NP takes place, so that an individual changeover point $COP_P$ results from this for each production injection-molding cycle.

2. Alternatively or additionally, if the time period of the remaining injection phase is still long enough, the injection rate profile can also be adjusted, as a result of which the temporal course of the pressure curve $p_{PMass}(t)$ correlating to the mass pressure curve changes.

There are a plurality of alternative possibilities for determining the viscosity index $VI_L$ or $VI_P$ during the learning injection-molding cycle or during the production injection-molding cycle.

1st Possibility

According to a first possibility, the viscosity index $VI_L$ can be specified in the learning injection-molding cycle during the injection phase EP of the learning injection-molding cycle as a product of a flow number $F_{ZEL}$ and a correction constant $K_1$ normalized to the measure of an average injection rate $V_{MI}$, wherein the flow number $F_{ZEL}$ is a pressure integral of the pressure curve $p_{LMass}(t)$ within the limits $t(s=MI_{Pos1})$ and $t(s=MI_{Pos2})$. In this case, the screw position $s=MI_{Pos1}$ is preferably chosen such that it lies in a range in which the screw speed v has reached a constant value for the first time after initial acceleration effects. If appropriate, a suitably large safety margin $\Delta X_{vComp}$ can also be added to this position, in order to be able, if necessary, to compensate interference resulting from transient phenomena. The second position $s=MI_{Pos2}$ is in any case larger than the position of the changeover point $COP_L$ in the learning injection-molding cycle, i.e. the assigned time $t(s=MI_{Pos2})$ is smaller than the time $t(COP_L)$. The position $s=MI_{Pos1}$ is in each case somewhat larger than the position $s=MI_{Pos2}$, i.e. the screw reaches the position $s=MI_{Pos1}$ earlier than the position $s=MI_{Pos2}$.

A thus-determined viscosity index $VI_L$ can—as was discovered according to the invention—characterize the melt used in the learning injection-molding cycle with satisfactory accuracy with regards to the viscosity thereof, among other things.

2nd Possibility:

Alternatively, in a second possibility, the viscosity index $VI_L$ can be determined during a plasticization phase (PL) of the learning injection-molding cycle. A thus-determined viscosity index $VI_L$ is formed as a product of a flow number $F_{ZPlastL}$, which is determined during the plasticization phase PL of the learning injection-molding cycle, and a correction constant $K_2$, wherein this product is normalized over a length $I_{MM}$. In this case, the flow number $F_{ZPlast}$ is an integral of a drive moment $M_L(t)$ of a plasticization screw over time, wherein the time limits are determined by passing through different screw positions s, for example a first screw position $s=MM_{Pos1}$ and a second screw position $s=MM_{Pos2}$. The two integration limits $t(s=MM_{Pos1})$ and $t(s=MM_{Pos2})$ are chosen such that the drive moment $M_L(t)$ in this range is free or virtually free from interfering influences, such as e.g. acceleration or transient effects.

3rd Possibility:

The determination of the viscosity index $VI_P$ takes place in an analogous manner to the above-mentioned possibility 1 during the injection phase (EP) of the production injection-molding cycle, wherein the corresponding variables, which were explained above in the context of the learning injection-molding cycle, are in turn taken from the present production injection-molding cycle, which forms the basis of the determination of the viscosity index $VI_P$. In this case, analogously to possibility 1, a correction constant $K_1$ can be used.

4th Possibility:

In a fourth possibility, the determination of the viscosity index $VI_P$ can be carried out analogously to possibility 2 during the plasticization phase PP of the production injection-molding cycle. In this case, the variables, which were called upon for determining the viscosity index $VI_L$, are determined analogously for determining the viscosity index $VI_P$ in the production injection-molding cycle. In particular, the basis for determining the flow number $F_{PPlast}$ is now the torque $M_P(t)$ of a plasticization screw in the production injection-molding cycle.

By way of example, an injection pressure curve, hydraulic pressure curve, a cavity internal pressure curve or a mass pressure curve can be used as the pressure curves $P_{LMass}(t)$ and $p_{PMass}(t)$ correlating to the mass pressure curve or determined from a motor torque of an injection motor.

It has furthermore proven expedient, in a holding pressure phase NP of the production injection-molding cycle, to change the holding pressure $p_{NP}$ according to the formula $p_{NP}=p_N*(1+K_3*(VI_P-VI_L)/VI_L)$ by a factor $VI_P/VI_L$ compared to a pre-set holding pressure $p_N$. In this case, a correction constant $K_3$ may be used, which essentially depends on the molded part to be produced. A thinner walled molded part would only require a smaller holding-pressure adjustment, whilst a thicker walled molded part more likely requires a stronger adjustment. For example, two or more adjustment stages may be provided in the control for the constant $K_3$. The constant $K_3$ could then be selected by a machine operator in accordance with their experience on the basis of the three-dimensional shape and/or the other properties of the molded part to be produced. For example, four adjustment stages are offered: "slight", "moderate", "strong", "very strong", which the machine operator selects sensibly according to their experience.

Expediently, the screw position $s=MI_{Pos2}$ is arranged sufficiently far upstream of the changeover point $COP_P$ at least for the case that the viscosity indices $VI_P$ are in each case determined in the injection phase EP of the production injection-molding cycle, so that after determining this viscosity index $VI_P$, it is possible during the still remaining time, i.e. during the still remaining remainder of the injection phase EP up to the changeover point $COP_P$, by local displacement of the changeover point $COP_P$ or by adjusting the speed profile of the screw during the remaining injection phase (EP) to still have sufficient influence on the height of the filling index $FI_P$, so that the equation $FI_P = MPV_{eq} \cdot VI_P$ on which the invention is based is fulfilled. Here, a determination of the position $s=MI_{Pos2}$ must then take place in such a manner that, starting from the changeover point $COP_L$ of the learning injection-molding cycle, a maximum expected displacement of the changeover point $COP_P$ amounting to $\Delta s_{max}$ is taken into account and additionally a path is taken into account, which is required during a required calculation time $t_{RZ}$ for determining the filling index $FI_P$ after determining the viscosity index $VI_P$.

It is expedient to define the screw position $s=CP$ as a fixedly predetermined value at a predetermined pressure $p_{CP}$ or determine it therefrom or to choose a screw position s therefor, at which the non-return valve is reliably closed. Vagueness, which may arise with regards to the melt transport into the cavity up to the closing of a non-return valve, are hereby reliably hidden.

It has proven expedient to operate the injection-molding cycle during the injection phase EP or EL up to the changeover point $COP_L$ or $COP_P$ in a position-regulated manner with regards to the screw position s or in a position-regulated and pressure-limited manner and to operate after the changeover point $COP_L$ or $COP_P$ up to the end of the holding-pressure phase NP in a pressure-regulated manner.

For example, a displacement of the recorded pressure curves $p_{LMass}(t)$ and $p_{PMass}(t)$ may occur as a function of the closing behavior of a non-return valve, which is not based on a change of a viscosity of the melt and therefore on a change of the viscosity index $VI_L$, $VI_P$ of the melt. In order to compensate an error of this type, if required, a measurement interval $MI=MI_{Pos1}-MI_{Pos2}$ is displaced locally to larger or smaller screw positions as a function of the closing behavior of the non-return valve. In this case, the measurement interval MI is locally displaced to larger screw positions s, if a predetermined reference pressure $p_{Ref}$ is locally passed through earlier in the production cycle than in the learning cycle, i.e. the following is true:

$$s(pP_{RefP}) > s(p_{RefL}).$$

Conversely, it is expedient that the measurement interval $MI=MI_{Pos1}-MI_{Pos2}$ is displaced to smaller screw positions if a predetermined reference pressure $p_{Ref}$ is locally passed through later in the production cycle than in the learning cycle, i.e.

$$s(p_{RefP}) < s(p_{RefL}).$$

Furthermore, it has proven expedient to choose the reference pressure $p_{Ref}$ to be smaller than the pressure present at the position $MI_{Pos1}$, i.e. to choose a reference pressure $p_{Ref}$ which arises before the start of the determination of the viscosity index $VI_P$. The reference pressure $p_{Ref}$ in this case is a point on the recorded pressure curve $p_{PMass}(t)$ or $p_{LMass}(t)$ correlating to the mass pressure curve.

Using the method according to the invention, it is possible within wide limits to ensure correct mold filling as a function of the determined viscosity index $VI_P$. However, it may occur for example that during ongoing determination of the viscosity index $VI_P$ from production cycle to production cycle, a longer ongoing tendency of the deviation of the viscosity index $VI_P$ from one production cycle to another is detected. In such a case, it may be expedient to also adjust the viscosity index $VI_P$ even by means of a changed setting of the melt temperature, e.g. by means of the cylinder temperature, the back pressure or the plasticization speed.

Further advantageous configurations are specified in further sub-claims.

BRIEF DESCRIPTION OF THE DRAWING

In the following, the invention is explained in more detail by way of example on the basis of the drawing. In the figures:

FIG. 3: schematically shows a graph, on the basis of which, a second possibility for determining the viscosity index $VI_L$ or $VI_P$ is explained;

FIG. 4: schematically shows a graph, which shows a characteristic pressure curve $p_{PMass}(t)$ for a more viscous material compared to the learning injection-molding cycle, wherein a flow number $F_{ZEP}$ of the material and the required filling index $FI_P$ are illustrated cross-hatched;

DETAILED DESCRIPTION OF PREFERRED EMBODIMENTS

A learning phase of the method according to the invention (FIG. 1) assumes that an injection machine, which is equipped with a mold, is provided and the injection molding machine is set up for producing a good part in a cavity of the mold.

Figure 1:
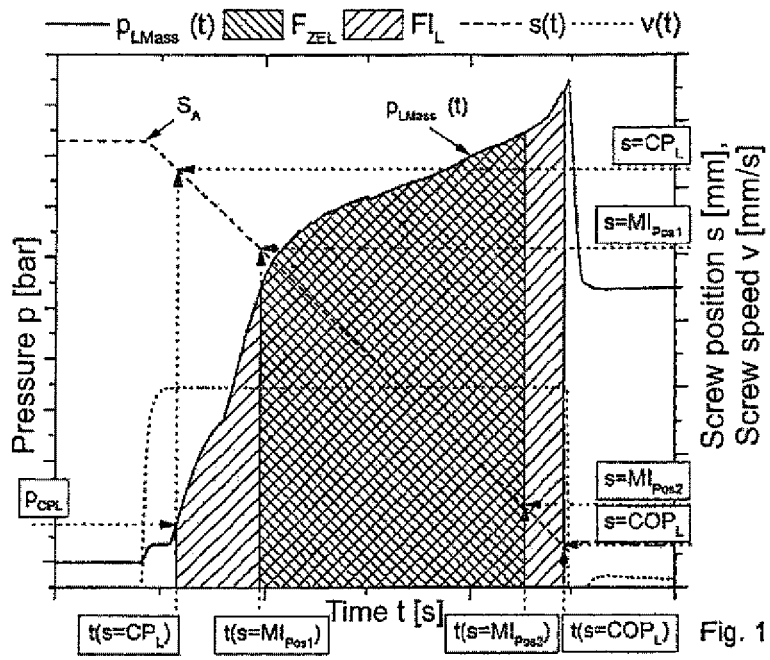
FIG. 1: schematically shows a graph of a learning injection-molding cycle for determining a molded-part volume equivalent $MPV_{eq}$.
Figure 2:
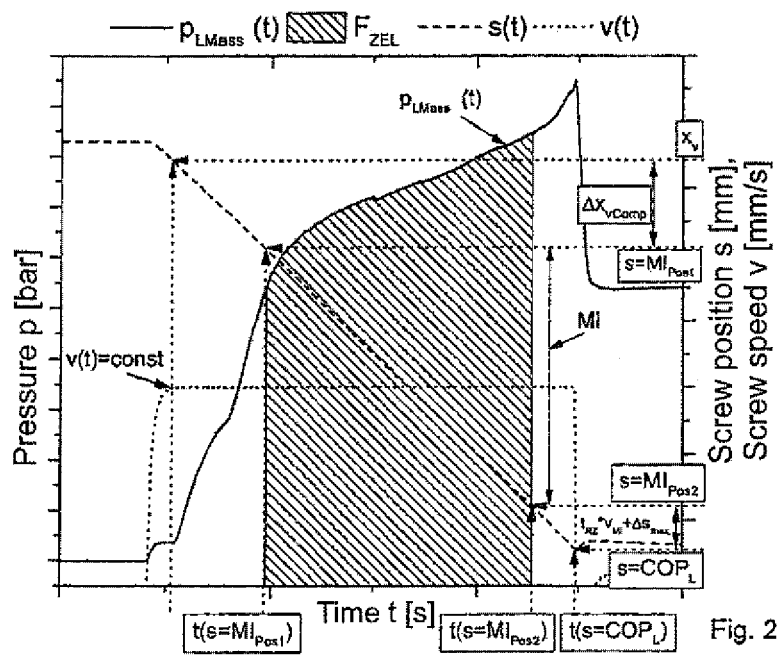
FIG. 2: schematically shows the graph according to FIG. 1, without the cross-hatched area, which represents the filling index $FI_L$, on the basis of which, a sensible possibility is explained, of how integration limits $t(s=MI_{Pos1})$ and $t(s=MI_{Pos2})$ can be determined.

For better understanding of the following graphs, it is emphasized that the screw position s(t) in FIGS. 1, 2 decreases from an initial position $s_A$ up to the screw position at the changeover point $COP_L$ or $COP_P$, i.e. at $s=COP_L$ or $s=COP_P$.

While a learning injection-molding cycle for obtaining a good part is carried out, a pressure curve $p_{LMass}(t)$ is recorded, which correlates to the mass pressure curve of the learning injection-molding cycle. The recording of this pressure curve takes place over the time t. In addition to this pressure curve $p_{LMass}(t)$, the screw position s(t) and the screw speed v(t) are drawn in by means of the dashed line in FIG. 1. Characteristic times $t(s=CP_L)$, $t(s=MI_{Pos1})$, $t(s=MI_{Pos2})$ and $t(s=COP_L)$ are drawn in on the time axis. The area below the curve $p_{LMass}(t)$ inside the limits of $t(s=MI_{Pos1})$ and $t(s=MI_{Pos2})$ represents a flow number $F_{ZEL}$ of the present melt and is determined by $$F_{ZEL} = \int_{t(s=MI_{Pos1})}^{t(s=MI_{Pos2})} p_{LMass}(t)\,dt$$

An average value of the screw speed v(t) is formed between the integration limits $t(s=MI_{Pos1})$ and $t(s=MI_{Pos2})$. The average value is labelled with $V_{MI}$. The flow number $F_{ZEL}$ normalized with the average value $V_{MI}$ and if necessary multiplied with a correction constant $K_1$ for scaling gives the viscosity index $VI_L$, which represents the characteristic of the melt of the learning injection-molding cycle, determined in the injection phase EL.

A filling index $FI_L$ is determined as an index in the learning injection-molding cycle, wherein the filling index $FI_L$ corresponds to the area below the curve $p_{LMass}(t)$ in the limits from $t(s=CP_L)$ to $t(s=COP_L)$ and is determined by means of the integral $$FI_L = \int_{t(s=CP_L)}^{t(s=COP_L)} p_{LMass}(t)\,dt$$

The upper integration limit $t(s=COP_L)$ in this case is the position, pre-set in the learning injection-molding cycle, of the changeover point $COP_L$, to which the corresponding time value $t(s=COP_L)$ upon reaching the screw position s corresponds. In this case, it is assumed according to the invention that during the injection phase EL, the mold filling at the changeover point $COP_L$ is finished. A further mold filling during the holding-pressure phase NP, which is subsequent to the injection phase EP, is disregarded here. The lower integration limit $t(s=CP_L)$ from which the integration for determining the filling index $FI_L$ takes place, is determined in such a manner in this case that at the start of integration $t(s=CP_L)$, an effective filling of the cavity of the mold begins or has already begun. This is the case in particular if a non-return valve, which may be present, is securely closed. Because the determination of the accurate closing time of the non-return valve is technically complicated or is only possible imprecisely using simple technical means, a predetermined pressure value $p_{CP}$ can alternatively be chosen, at which, according to experience, the effective filling of the cavity has begun, that is to say a closing of the non-return valve has already taken place. A pressure value $p_{CP}=p_{LMass}(t(s=CP_L))$ of this type is chosen expediently with regards to its size in such a manner that this pressure value is smaller than the pressure value $p_{LMass}(t)$ at time $t(s=MI_{Pos1})$.

During the good-part cycle, the two above-described integrals are recorded and the values of the viscosity index $VI_L$ and the filling index $FI_L$ determined here are subsequently placed in a relationship to one another, wherein this relationship $FI_L/VI_L$ forms the molded-part volume equivalent $MPV_{eq}$.

In the following, a possibility for determining the integration limits $t(s=MI_{Pos1})$ and $t(s=MI_{Pos2})$ is explained by way of example on the basis of FIG. 2. The integration start $t(s=MI_{Pos1})$ must be determined in a suitable manner so that the viscosity index $VI_L$ actually constitutes a measure for the characteristic of the melt in the learning injection-molding cycle. To this end, $s=MI_{Pos1}$ must in any case be larger than $s=MI_{Pos2}$. The integration start $t(s=MI_{Pos1})$ should be chosen to be as small as possible, i.e. $s=MI_{Pos1}$ should be chosen to be as large as possible, so that the integration interval between $t(s=MI_{Pos1})$ and $t(s=MI_{Pos2})$ becomes as large as possible and thus the determination of the viscosity index $VI_L$ becomes as accurate as possible. On the other hand, it should not fall below a minimum value $t(s=MI_{Pos1})$, so that start-up and acceleration processes of the screw and compression effects and transient phenomena inside the melt do not negatively influence the viscosity index $VI_L$. In order to overcome this conflict of objectives, determining the value $s=MI_{Pos1}$ as follows has proven successful.

As soon as the screw has reached the speed v(t) set in the control of the injection molding machine in a first stage of the set speed profile, this screw position $s=x_v$ is saved. A maximum compression path $\Delta x_{vComp}$ is deducted from this position $s=x_v$ as a safety distance. The safety distance $\Delta x_{vComp}$ is chosen in such a manner in this case that transient phenomena or compression processes inside the melt are eased safely. From this position it is satisfactorily ensured that the flow number $F_{ZEL}$ can be determined with sufficient accuracy. Thus, the first integration limit results when determining the viscosity index for $t(s=MI_{Pos1})=t(s=x_v-\Delta x_{vComp})$.

To sensibly obtain the upper integration limit $t(s=MI_{Pos2})$ when determining the viscosity index $VI_L$, it is necessary to determine the screw position $s=MI_{Pos2}$ in a suitable manner. A suitable method for this initially proceeds from the position $s=COP_L$ of the changeover point $COP_L$ in the learning injection-molding cycle. In this case, the position $s=COP_L$ is smaller than the position $s=MI_{Pos2}$. The invention is based inter alia on still having a sufficiently large remainder of the injection phase EP available in a production cycle, after the determination of the viscosity index $VI_P$, in order to still have sufficient influence on the filling index $FI_P$ of the same injection phase EP as a function of the viscosity index $VI_P$ determined in the injection phase EP. In this case, one requires a certain time starting from the finishing of the integral for determining the viscosity index $VI_P$, in order to calculate the required filling index $FI_P$. This calculation time $t_{RZ}$ lasts a few milliseconds and, together with the path of the screw traveled in this time, gives a certain calculation path $\Delta s=v_{MI}*t_{RZ}$.

Furthermore, according to the invention, the adjustment of the filling index $FI_P$ is implemented inter alia by means of a displacement of the changeover point $COP_P$ to larger or smaller screw positions s. One such maximum possible displacement of the changeover point $COP_P$ to larger screw positions s is labelled with $\Delta s_{max}$, so that it has proven expedient to choose the screw position $s=MI_{Pos2}$ of the upper integration limit for $s=MI_{Pos2}>COP_L+V_{MI}*t_{RZ}+\Delta s_{max}$.

This integration span, determined once in the learning injection-molding cycle during the injection phase EL, between the starting point $t(s=MI_{Pos1})$ and the end point $t(s=MI_{Pos2})$ is termed the measurement interval $MI=MI_{Pos1}-MI_{Pos2}$ with respect to the associated screw positions s. This measurement interval MI is then retained in terms of the size thereof for the subsequent production injection-molding cycles.

One alternative for determining the viscosity index $VI_L$ in the learning injection-molding cycle or analogously to the viscosity index $VI_P$ in the production injection-molding cycle is explained on the basis of FIG. 3. A typical moment curve $M_L(t)$ of a plasticization screw in the learning injection-molding cycle is illustrated in FIG. 3. One such typical curve also arises in the production injection-molding cycle as $M_P(t)$. The curves $M_L(t)$ and $M_P(t)$ in this case show a torque curve of a plasticization screw during a plasticization phase PP. It has been established that the plasticization phase PP is also suitable in order to determine a viscosity index $VI_L$ or $VI_P$ of the melt. To this end, a flow number $F_{ZPlastL}$ is formed as an integral over the drive moment $M_L(t)$ as a function of time in the limits of $t(s=MM_{Pos1})$ to $t(s=MM_{Pos2})$. This flow number $F_{ZPlastL}$ is normalized over the length $I_{MM}=MM_{Pos2}-MM_{Pos1}$ and, if necessary, multiplied by a correction constant $K_2$ for scaling. In this case, the integration limits $MM_{Pos1}$ and $MM_{Pos2}$ are set in such a manner that on the one hand, a sufficiently large distance prevails between these positions in order to determine the viscosity index $VI_L$; $VI_P$ with sufficient accuracy. On the other hand, the positions $MM_{Pos1}$ and $MM_{Pos2}$ should be sufficiently far away from transient or detuning phenomena when starting up and when braking the plasticization screw. An integration range, determined once in the learning phase, between the positions $MM_{Pos1}$ and $MM_{Pos2}$ or the associated times $t(s=MM_{Pos1})$ and $t(s=MM_{Pos2})$ is also retained in the later production injection-molding cycles. The plasticization phase PP in which the melt is prepared for a subsequent injection phase EP is for example considered as a relevant plasticization phase PP. The value for the molded-part volume equivalent $MPV_{eq}$ can in turn be determined according to the invention according to the equation $MPV_{eq}=FI_L/VI_L$ using the viscosity index $VI_L$ and the filling index $FI_L$ determined in the subsequent injection phase EL.

It is only mentioned for the sake of clarity that, for the case that the viscosity index $VI_L$ is determined in the learning injection-molding cycle during the injection phase EL, as is illustrated in FIG. 2, the viscosity index $VI_P$ is of course likewise determined in the injection phase EP of the production injection-molding cycle in the subsequent production injection-molding cycles. If the viscosity index $VI_L$ is determined in the learning injection-molding cycle during the plasticization phase PP, the viscosity index $VI_P$ is also likewise determined during the plasticization phase PP in the subsequent production injection-molding cycles.

During the learning phase, i.e. during the production of at least one good part, the following listed values were therefore learned on the basis of the good-part injection-molding cycle:

a) The value for the molded-part volume equivalent $MPV_{eq}$;
b) The value for the measurement interval $MI=MI_{Pos1}-MI_{Pos2}$, within which the flow number $F_{ZEL}$ was determined. The size of the measurement interval MI is also used as a basis for the subsequent production cycles.
c) Furthermore, the pressure value $p_{CP}$ determined in the learning phase is likewise carried over into the production phase. Analogously to the learning phase, the time $t(s=CP_P)$ at which the pressure curve $p_{PMass}(t)$ passes through the predetermined or determined pressure value $p_{CP}$ is used in the production phase as the lower integration limit in the production phase during the determination of the filling index $FI_P$.
d) For the case that the viscosity index $VI_L$ was determined during the injection phase EL, the values of the screw position $s=MI_{Pos1}$ and $s=MI_{Pos2}$ are additionally carried over and if necessary adjusted with regards to the absolute values thereof, as is explained below on the basis of FIG. 6.
e) For the case that the viscosity index $VI_L$ was determined during the plasticization phase PL, the values of the screw positions $s=MM_{Pos1}$ and $s=MM_{Pos2}$ are carried over.
f) As long as constants $K_1 \neq 1$ and $K_2 \neq 1$ were used in the learning phase, these constants $K_1$ and $K_2$ are also carried over into the production phase.

The production phase of the method according to the invention is explained in the following on the basis of FIGS. 4 to 6. FIG. 4 shows a graph, in which the mass pressure $p_{PMass}(t)$ is entered over time t. A solid line shows the mass pressure curve $p_{PMass}(t)$ of a material in the production injection-molding cycle. Furthermore, the mass pressure curve $p_{LMass}(t)$, as was recorded in the learning injection-molding cycle, is illustrated dotted for comparison. Furthermore, the injection phase EP and a portion of the holding-pressure phase NP are illustrated. The level of the pressure curve $p_{PMass}(t)$ is clearly increased within the integration limits $t(s=MI_{Pos1})$ and $t(s=MI_{Pos2})$ compared to the pressure curve $p_{LMass}(t)$ within these limits. Therefore, a larger value for the flow number $F_{ZEP}$ results therefrom, if the integral is determined over the pressure curve $p_{PMass}(t)$ within the limits $t(s=MI_{Pos1})$ and $t(s=MI_{Pos2})$. The viscosity index $VI_P$ of the material can be determined therefrom analogously to the learning phase using the constant $K_1$ and the average speed $V_{MI}$. From the value of the viscosity index $VI_P$ of the material, which is determined at time $t(s=MI_{Pos2})$ at the latest, it is then possible to determine $FI_P=MPV_{eq}*VI_P$ using the equation, which value the filling index $FI_P$ for the material must achieve, in order to achieve a volumetrically correct mold filling and therefore also to obtain a good part using the material of the production injection-molding cycle, which has a different viscosity index $VI_P$ from the material from the learning phase. This succeeds in that the integral ongoing temporally from the time $t(s=CP_P)$ for determining the filling index $FI_P$ of the material is determined in an ongoing manner and as soon as the viscosity index $VI_P$ is known, the required filling index $FI_P$ is determined. If the ongoing integral for determining the current filling index $FI_P$ reaches the value of the required filling index $FI_P$, then the changeover to the holding-pressure phase NP takes place.

In the case of a more viscous material, the changeover point $COP_P$ is situated e.g. temporally after the changeover point $t(s=COP_L)$. The invention makes it possible to also maintain the value $MPV_{eq}$, which was determined in the learning injection-molding cycle, in the production injection-molding cycle in the case of a material which has a different material quality compared to the material, which was used in the learning process and therefore to achieve a volumetrically correct filling of the cavity and thus to obtain a good part. A further improvement of the quality of the parts can be achieved in spite of fluctuating melt quality, i.e. in spite of fluctuating viscosity index $VI_P$ with respect to the viscosity index $VI_L$ determined in the learning process, if a holding pressure $p_{NP}$ in the production phase is adjusted with respect to a pre-set holding pressure $p_N$, which may be e.g. holding pressure run in the learning phase. In this case, it has proven successful to adjust the holding pressure $p_{NP}$ in the production phase according to the formula $p_{NP}=p_N* (1+K_3(VI_P-VI_L)/VI_L$, where $K_3$ is a correction constant. The correction constant $K_3$ can in this case map workpiece properties of the molded part to be produced. Thus, for example, the correction constant $K_3$ can for example be applied somewhat smaller in the case of a particularly thin-walled molded part than in the case of a thicker walled molded part. This is because in the case of a thin-walled molded part, the mold filling is less effective in the holding-pressure phase than in the case of a thicker walled molded part.

Figure 5:
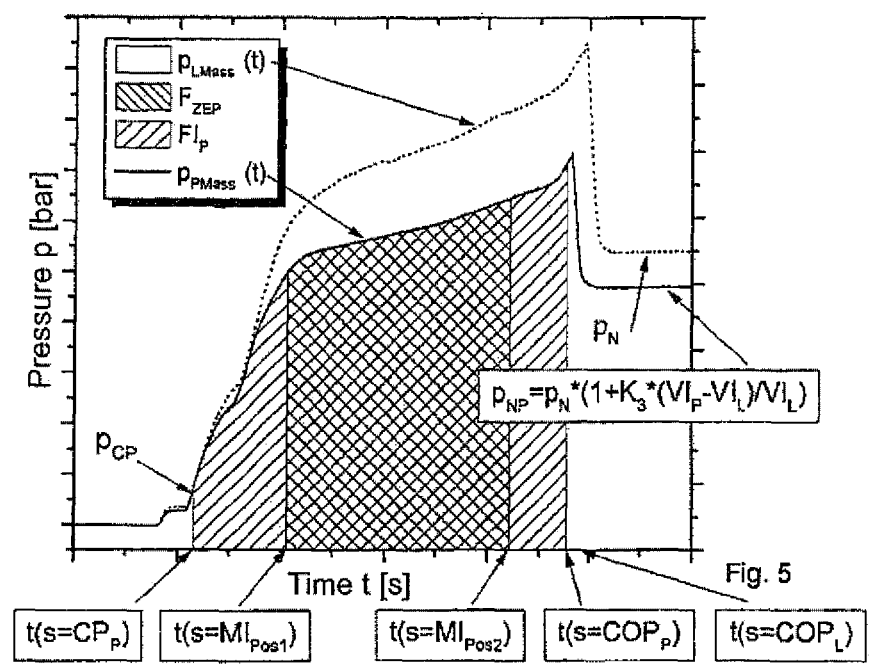
FIG. 5: shows the graph according to FIG. 4, wherein the flow number $F_{ZEP}$ of a less viscous material compared to the learning process and the required filling index $FI_P$ thereof are drawn in cross-hatched.

FIG. 5 shows a production injection-molding cycle, in which a pressure curve $p_{PMass}(t)$ runs at a lower level compared to a pressure curve $p_{LMass}(t)$. This means, in the case of otherwise identical boundary conditions, that the material has a low viscosity or a lower viscosity index $VI_P$ than the material which was used in the learning injection-molding cycle during the learning phase. A holding-pressure level $p_{NP}$ is lowered for the material of the production injection-molding cycle compared to the holding-pressure level of the learning injection-molding cycle or a pre-set holding pressure $p_N$. The time $t(s=COP_P)$ is displaced to be "earlier" compared to the time $t(s=COP_L)$, which means a displacement of the changeover point $COP_P$ to a larger screw position s for the changeover point $(s=COP_P)$ of the material in the production injection-molding cycle.

Figure 6:
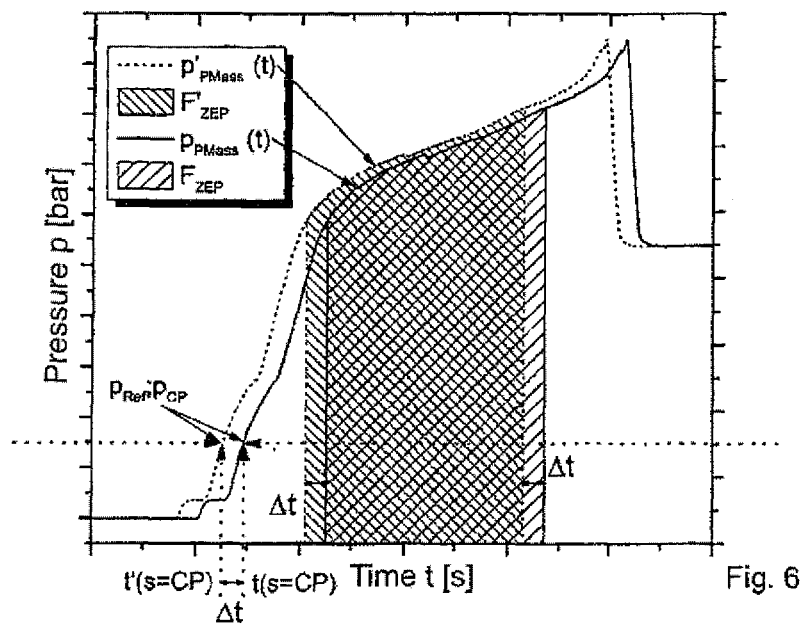
FIG. 6: shows a graph, on the basis of which, a displacement of a measurement interval MI is explained.

Due to certain effects, e.g. due to a changing closing behavior of a non-return valve, it may occur that a reference pressure value $p_{Ref}$, e.g. the pressure value $p_{CP}$ is passed through temporally earlier at a time $t'(s=CP)$ (cf. FIG. 6). The lower integration limit for the determination of the filling index $FI_P$ is thereby changed, so that a miscalculation of the viscosity index $VI_P$ and therefore of the required filling index $FI_P$ would result if the integration limits $t(s=MI_{Pos1})$ and $t(s=MI_{Pos2})$ are maintained. This may result in production of a scrap part. To prevent this, it is expedient in such a case, in which passing through the reference pressure value $p_{Ref}$ is displaced by a period of time $\Delta t$ in the direction of "early" or the direction of "late", to also correspondingly displace the integration limits $t(s=MI_{Pos1})$ and $t(s=MI_{Pos1})$ towards "early" or "late" by the time period $\Delta t$. Alternatively, the measurement interval MI can also correspondingly be displaced to larger or smaller screw positions, wherein the size of the measurement interval MI preferably remains the same.

In FIG. 6, this time displacement by $\Delta t$ is shown qualitatively by way of the example of a material which is otherwise constant with regards to its viscosity.

Figure 7:
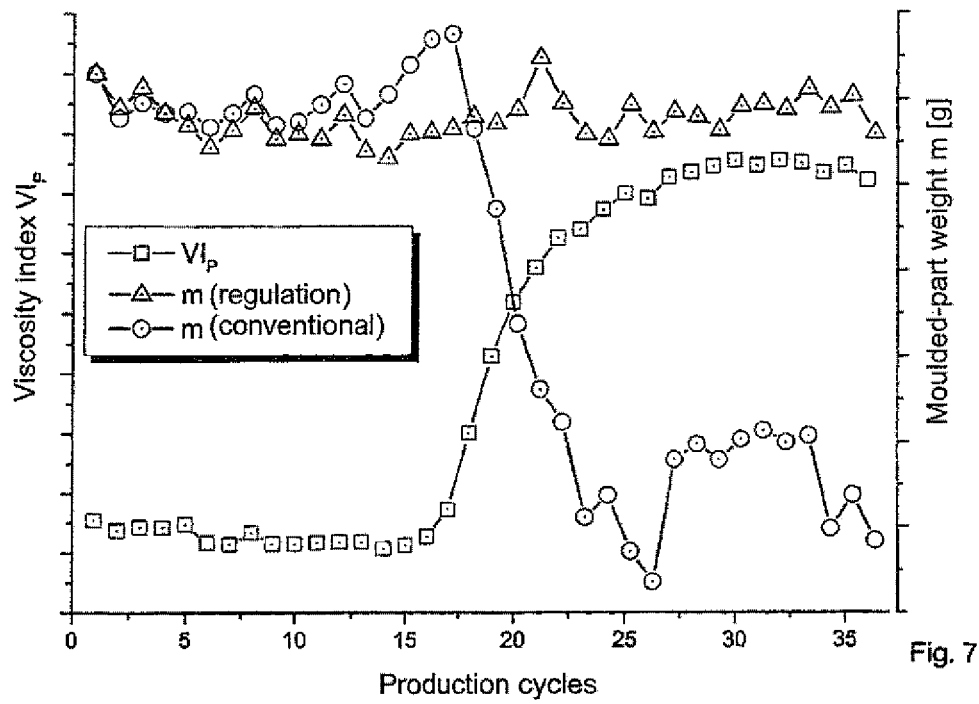
FIG. 7: schematically shows a graph over a multiplicity of production cycles, which shows the dependence of the molded-part weight of the viscosity index $VI_P$ of the material used in the case of a method according to the prior art without regulation according to the invention and in the case of a method according to the invention.

The positive mode of action of the method according to the invention becomes clear on the basis of FIG. 7. In a first curve (empty squares), FIG. 7 shows the course of the viscosity index $VI_P$ characterizing the melt over a multiplicity of production cycles. In the illustration according to the example, the viscosity index $VI_P$ initially increases sharply from the 17th cycle, in order to then approach a higher limit value. A curve of this type for example corresponds to a cooling of the melt, from which a higher viscosity index $VI_P$ results.

In conventional process management, illustrated in a second curve of FIG. 7 (empty circles), a change of this type of the viscosity index $VI_P$ with increasing viscosity index $VI_P$ has a clearly falling molded-part weight as a consequence. This means that the volumetric filling was not satisfactory and sink marks or under-filling may occur in the case of falling molded-part weights of this type. Scrap parts are therefore created thereby.

The course of the molded-part weight when the method according to the invention is applied is illustrated in a third curve of FIG. 7 (empty triangles). It becomes clear that in spite of increasing viscosity index $VI_P$ from the 17th cycle, the method according to the invention is able to keep the molded-part weight virtually constant in spite of changing melt properties. Although, starting from the 17th cycle, the melt characteristic changes considerably with regards to the viscosity index $VI_P$ thereof, the method according to the invention is able to keep the molded-part weights virtually constant and therefore to ensure a volumetrically correct filling of the cavity, which leads to good parts.

Figure 8:
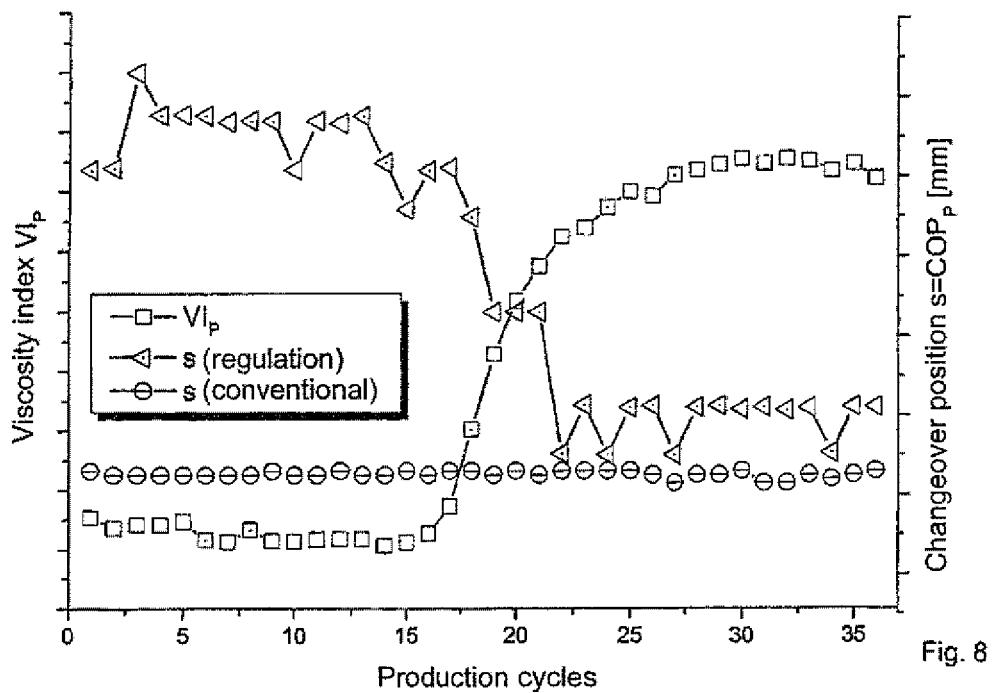
FIG. 8: schematically shows a graph over a multiplicity of production cycles, from which it emerges, how in the case of a changing viscosity index $VI_P$ of the material, the changeover position $COP_P$ changes in the method according to the invention and remains constant in a conventional method according to the prior art.

In FIG. 8, it is shown how changing a viscosity index $VI_P$ over a multiplicity of production cycles has an effect on the changeover position $s=COP_P$ in conventional process management and in process management according to the invention. In a first curve (empty rectangles), the course of the viscosity index $VI_P$ is illustrated over a multiplicity of cycles. As already explained in FIG. 7, the viscosity index $VI_P$ increases sharply from the 17th cycle and approaches a higher level up to the 35th cycle. In conventional process management (empty circles), the changeover point $COP_P$ is not influenced. The changeover position $s=COP_P$ remains virtually constant during all 35 cycles. If the method according to the invention is applied, it becomes clear on the basis of a third curve (empty triangles), that the changeover position $s=COP_P$ is displaced to lower screw positions in a manner correlating to the increase of the viscosity index $VI_P$ and remains virtually constant starting approximately from the 26th cycle.

The method according to the invention is suitable for application on electro- and hydromechanical injection molding machines of all sizes. In particular, it is easily possible, e.g. in the context of programming the operating software of an injection molding machine, to integrate the method according to the invention in new machines. Furthermore, the method according to the invention is based on measured values, e.g. pressure measurements during the injection and/or holding-pressure phase, travel measurements of the screw during the injection phase, travel measurements and torque measurements of a plasticization screw during a plasticization phase and the like, which are usually already measured in the case of injection molding machines, so that no additional measurement sensors or the like have to be attached for the method according to the invention. In this respect, the method according to the invention is also exceptionally suitable as a retrofit solution for pre-existing injection molding machines.

Injection molding machines, which are operated using the method according to the invention, are able to automatically compensate negative effects of batch fluctuations on molded-part quality for example. In any case, negative effects on the molded-part quality when restarting the machines, e.g. in the event of faults or after a certain stoppage, are compensated automatically by means of the state-dependent process management according to the invention. The machine operator has to intervene in the production process less often, in order for example to manually adjust a parameter of the injection molding machine. The quality differences of the individual molded parts are reduced to a minimum, even in the case of changing production and/or environmental conditions.

Depending on the material properties, for example the material moisture, the material composition (batch fluctuations) and the influence thereof on the operation of an injection molded machine, e.g. the influence thereof on the closing behavior of a non-return valve, can be corrected automatically by the method according to the invention without the intervention of a machine operator. As a result, over-injection or also underfilling of the cavities inter alia is prevented during the production of the molded parts. Considerable cost savings can be achieved as a result. The process reliability and the degree of automation can be increased.

External influences, such a e.g. fluctuating environmental temperatures in a shop, in which the injection molding machine is installed, can also be compensated using the method according to the invention. Fluctuating environmental temperatures, which can be set for example by means of different solar irradiation or by means of a different number of injection molding machines or plants, which are operated in the shop, lead in the case of fixedly pre-set settings to minimal viscosity fluctuations in the melt to be processed. Viscosity fluctuations of this type have a negative effect on the molded-part quality. Change of the melt characteristic of this type, particularly of the viscosity, can be detected using the method according to the invention and in spite of that a reliable and complete filling of the cavity of the mold can be ensured by means of a changed process management.

LIST OF REFERENCE SIGNS $p_{LMass}(t)$ Pressure curve in the learning injection-molding cycle
$VI_L$ Viscosity index in the learning injection-molding cycle
EL Injection phase of the learning injection-molding cycle
PL Plasticization phase of the learning injection-molding cycle
$FI_L$ Filling index of the learning injection-molding cycle
s Screw position
t(s) Time at which a certain screw position s is reached
$COP_L$ Changeover point
$s=COP_L$ Screw position at changeover point
$s=CP_L$ Screw position at the start of the integration for determining the filling index $FI_L$
$MPV_{eq}$ Molded-part volume equivalent
$p_{PMass}(t)$ Pressure curve of a pressure correlating to the mass pressure curve during the production phase
$VI_P$ Viscosity index during the production injection-molding cycle
EP Injection phase of the production cycle
PP Plasticization phase of the production injection-molding cycle
$FI_P$ Filling index of the production injection-molding cycle
MEP Machine setting parameter
$F_{ZEL}$ Flow number determined during the injection phase in the learning injection-molding cycle
$K_1$ Correction constant
$V_{MI}$ Average value of a screw speed v(t) between the screw positions $MI_{Pos1}$ and $MI_{Pos2}$
$F_{ZPlastL}$ Flow number of a melt determined during a plasticization phase PL of the learning injection-molding cycle
$MM_{Pos1}$ and $MM_{Pos2}$ Screw positions s during the plasticization phase PL
$I_{MM}$ Measurement interval during the plasticization phase PP
$M_L(t)$ Drive moment during the learning injection-molding cycle
$K_2$ Correction constant
MI Measurement interval during an injection phase EP; EL
$F_{ZEP}$ Flow number determined during an injection phase in the production injection-molding cycle
$F_{ZPlastP}$ Flow number determined during a plasticization phase PP in the production injection-molding cycle
$M_P(t)$ Moment curve of a drive moment of a plasticization screw during the production cycle
$p_{NP}$ Adjusted holding pressure
$p_N$ Pre-set holding pressure
$K_3$ Correction constant
$t_{RZ}$ Calculation time
$\Delta s_{max}$ Maximum displacement of the changeover point
$p_{CP}$ Pre-set pressure value at the screw position $s=CP_L$ or $s=CP_P$
$p_{Ref}$ Reference pressure
$p_{RefP}$ Reference pressure in the production cycle
$p_{RefL}$ Reference pressure in the learning cycle

What is claimed is:
1. A method for the volumetrically correct filling of a cavity of a mold with a melt of a material to be processed in an injection-molding process, said method comprising a learning phase and a production phase:
  performing said learning phase comprising the steps of:
    providing an injection molding machine equipped with a mold and set up for producing a usable part in a cavity of the mold;
    carrying out at least one learning injection-molding cycle to obtain the usable part and recording a pressure curve correlating to a mass pressure curve;
    determining a viscosity index, which characterizes a melt of the learning injection-molding cycle, during an injection phase of the learning injection-molding cycle or during a plasticization phase preceding the learning injection-molding cycle;
    determining a filling index as an index for the volumetrically correct filling of the cavity of the usable part in the learning injection-molding cycle, wherein the following equation applies:

$$FIL = L_{t(s=CPi)}^{t(s=COPd)} PLMass(t)dt$$

wherein
    FIL is the filling index,
    COPL is a changeover point in the learning injection-molding cycle,
    (s=COPL) is a screw position at the changeover point in the learning injection-molding cycle,
    (s=CPL) is a screw position at the start of integration for determining the filling index,
    t(s=COPL) is the time at the screw position of the changeover point in the learning injection-molding cycle,
    PLMass(t) is the pressure curve, and
    t(s=CPL) is the time at which the screw position has reached a position at which a predefined pressure PLMass(t)=PcP is applied, or has reached a position at which the filling of the cavity begins, wherein the following equation applies:

$s=CPL>s=COPL$; and forming a molded-part volume equivalent
  MPVeq=FILNIL, wherein VIL is the viscosity index,
  performing said production phase comprising the steps of:
carrying out a multiplicity of production injection-molding cycles using the mold;
recording at least one pressure curve correlating to the mass pressure curve during a current cycle of the multiplicity of production injection-molding cycles;
determining a viscosity index, which characterizes the melt of the current production injection-molding cycle, during the injection phase of the current production injection-molding cycle or during a plasticization phase preceding the current production injection-molding cycle,
after determining the viscosity index, calculating a required filling index for the current production injection-molding cycle in accordance with the equation:

$$FIp=MPVeq*VIp$$

and
adjusting a changeover point of the current production injection-molding cycle and/or an injection rate profile in such a manner during a remaining injection phase (EP) of the current production injection-molding cycle that the following equation applies:

$$FIp = J_{t(s=CPp)}^{t(s=COPp)} PPMass(t)dt = MPVeq \cdot VIp$$

wherein
COPp is the changeover point in the production injection-molding cycle,
(s=COPp) is a screw position at the changeover point in the production injection-molding cycle,
(s=CPp) is a screw position at the start of integration for determining the filling index,
FIp is the required filling index,
PPMass(t) is the at least one pressure curve,
VIp is the viscosity index.

2. The method of claim 1, wherein the determination of the viscosity index, which characterizes the melt of the learning injection-molding cycle, is implemented during the injection phase of the learning injection-molding cycle in accordance with the following equation:

$$VIL=FzeL*K1NM1 \text{ with}$$

$$F_{ZEL} = f_{lt(s=MIPos1)}^{t(s=MIPo\&z)} p_{LMass}(t)dt$$

wherein
(s=MIp051) and (s=MIPos2) are different screw positions during the injection phase and
t(s=MIPos1) and t(s=MIPos2) are different times for the corresponding screw positions (s=MIPos1, s=MIPos2) and the following equation applies:

$$MIPos1>MIPos2>COPL, \text{ wherein}$$

VMi is an average value of a screw speed between the different screw positions, and
$K_1$ is a correction constant for scaling.

3. The method of claim 2, wherein one of the different screw positions is located sufficiently far upstream of the changeover point when the viscosity index in the production phase is determined in the injection phase of the injection-molding cycles, so that after determining the viscosity index, it is possible during the remainder of the injection phase up to the changeover point of the current production injection-molding cycle to influence a height of the filling index by shifting the changeover point or by adjusting the speed profile, and the following applies:

$$MIPos2>COPL+VMi*tRz+ASmax, \text{ wherein}$$

tRz is a calculation time for determining the filling index, and
Asmax is a maximum expected local displacement of the changeover point in the learning phase compared to the changeover point in the production phase.

4. The method of claim 2, further comprising shifting a measurement interval in accordance with the equation $MI=MI_{Pos1}-MI_{Pos2}$ during determination of the viscosity index in the learning phase or in the production phase as a function of a closing behavior of a non-return valve.

5. The method of claim 4, wherein the measurement interval is shifted to larger screw positions, when a predetermined reference pressure is locally passed through earlier in the production phase than in the learning phase in correspondence with:

$$s(P_{RefP})>s(p_{RefL}), \text{ wherein}$$

$s(p_{RefP})$ is the screw position at the reference pressure in the production phase, and
$s(p_{RefL})$ is the screw position at a reference pressure in the learning phase.

6. The method of claim 4, wherein the measurement interval shifted to smaller screw positions, when a predetermined reference pressure is locally passed through later in the production phase than in the learning phase in correspondence with:

$$s(p_{RefP})<s(P_{RefL}), \text{ wherein}$$

$s(p_{RefP})$ is the screw position at the reference pressure in the production phase, and
$s(p_{RefL})$ is the screw position at a reference pressure in the learning phase.

7. The method of claim 5, wherein the reference pressure is chosen in such a manner that it is smaller than a pressure applied at the screw position in the injection phase.

8. The method of claim 6, wherein the reference pressure is chosen in such a manner that it is smaller than a pressure applied at the screw position in the injection phase.

9. The method of claim 1, wherein the determination of the viscosity index, which characterizes the melt of the learning injection-molding cycle, is implemented during the plasticization phase preceding the learning injection-molding cycle in accordance with the following equation:

$$VIL-FzPlastL*K2/IMM \text{ with}$$

$$F_{ZPlastL} \int_{t(s=MM_{Pos1})}^{t(s=MM_{Pos2})} M_L(t) dt$$

wherein
(s=MMPos1) and (s=MMPos2) are different screw positions,
t(s=MMPos1) and t(s=MMPos2) are different times for the corresponding screw positions (s=MMPos1, s=MMPos2) during the plasticization phase and the following applies:

$$MMPos1<MMPos2 \text{ and}$$

$$IMM=MMPosrMMPos1, \text{ wherein}$$

ML(t) is a drive moment of a plasticization screw, and
$K_2$ is a correction constant for scaling.

10. The method of claim 1, wherein the determination of the viscosity index, which characterizes the melt of the current production injection-molding cycle, is implemented during the injection phase of the current production injection-molding cycle in accordance with the following equation:

$$VIp = FzEP * K1 NM1$$ with $$FzEP = \int_{lt(s=MIPoss)}^{t(s=MIPos_s)} p_{PMass}(t)dt$$

wherein (s=MIPos1) and (s=MIPos2) are different screw positions, t(s=MIPos1) and t(s=MIPos2) are the times for the corresponding screw positions (s=MIPos1, s=MIPos2) during the injection phase and the following applies:

$$Mlpos1 > MfPos2 > COPp, \text{ wherein}$$

$VM_1$ is an average value of a screw speed between the different screw positions, and $K_1$ is the correction constant for scaling.

11. The method of claim 10, wherein one of the different screw positions is located sufficiently far upstream of the changeover point when the viscosity index in the production phase is determined in the injection phase of the injection-molding cycles, so that after determining the viscosity index, it is possible during the remainder of the injection phase up to the changeover point of the current production injection-molding cycle to influence a height of the filling index by shifting the changeover point or by adjusting the speed profile, and the following applies:

$$MIpos2 > COPL + VMr * tRz + As\text{max, wherein}$$

tRz is a calculation time for determining the filling index, and

Asmax is a maximum expected local displacement of the changeover point in the learning phase compared to the changeover point in the production phase.

12. The method of claim 1, wherein the determination of the viscosity index, which characterizes the melt of the current production injection-molding cycle, is implemented during the plasticization phase preceding the current production injection-molding cycle in accordance with the following equation: $VIp = FzP1astP * K2/IMM$ with $$F_{ZPlastP} = L_{t(s,;MMPos:il)}^{t(s=MMPost)} Mp(t)dt$$

wherein (s=MMPos1) and (s=MMPos2) are different screw positions during the plasticization phase, t(s=MMPos1) and t(s=MMPos2) are different times for the corresponding screw positions (s=MMPos1, s=MMPos2) and the following applies:

$$MMPos1 < MMPos2 \text{ and}$$

$$IMM = MMPosrMMPos1, \text{ wherein}$$

Mp(t) is a drive moment of a plasticization screw, and K2 is the correction constant.

13. The method of claim 1, wherein the pressure curve in the learning phase and the pressure curve in the production phase, which correlate to the mass pressure curve, are an injection pressure curve, a hydraulic pressure curve, a cavity internal pressure curve or a mass pressure curve or are determined from a motor torque of an injection motor.

14. The method of claim 1, wherein in a holding-pressure phase of the current production injection-molding cycle, a holding pressure is changed with respect to a pre-set holding pressure, wherein the following equation applies:

$$PNP = PN * (1 + K3 * (VIp - VIL)NIL), \text{ wherein}$$

PNP is the holding pressure,
PN is the pre-set holding pressure,
K3 is a correction constant,
VIp is the viscosity index of the current production injection-molding cycle, and
VIL is the viscosity index of the learning injection-molding cycle.

15. The method of claim 14, wherein the injection-molding cycle is implemented during the injection phase in the learning phase and the production phase up to the changeover points, respectively, in a position-regulated manner with regards to the screw positions or in a position-regulated and pressure-limited manner and after the changeover points takes place up to the end of the holding-pressure phase in a pressure-regulated manner.

16. The method of claim 1, wherein the screw positions at the start of integration for determining the filling index in the learning phase and the production phase are determined from a fixedly predetermined value or is a screw position, at which a non-return valve is closed.

17. The method of claim 1, further comprising adjusting the viscosity index in the production phase as a function of a melting temperature, a back pressure, or a plasticization speed.

18. The method of claim 17, wherein the viscosity index in the production phase is adjusted as a function of a cylinder temperature.

19. The method of claim 1, further comprising executing the learning phase for determining the molded-part volume equivalent on a first injection molding machine, and executing the production phase with a second injection molding machine, after a mold change from the first injection molding machine to the second injection molding machine and a value at least for the molded-part volume equivalent is carried over to a control of the second injection molding machine.

* * * * *